(12) United States Patent
Doerflein et al.

(10) Patent No.: US 6,783,319 B2
(45) Date of Patent: Aug. 31, 2004

(54) METHOD AND APPARATUS FOR SUPPORTING ROTOR ASSEMBLIES DURING UNBALANCES

(75) Inventors: Thomas Matthew Doerflein, Cincinnati, OH (US); Stephen Anthony Wilton, Cincinnati, OH (US); Barry Lynn Allmon, Maineville, OH (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/949,241

(22) Filed: Sep. 7, 2001

(65) Prior Publication Data

US 2003/0210979 A1 Nov. 13, 2003

(51) Int. Cl.⁷ ............................................... F01D 25/16
(52) U.S. Cl. ........................... 415/1; 415/9; 415/174.4; 415/229; 416/2; 416/174; 60/39.091; 60/223; 60/779; 384/495; 384/624
(58) Field of Search ............................. 415/1, 9, 170.1, 415/174.4, 229, 230, 231; 416/2, 174; 60/223, 779, 39.091; 384/102, 126, 495, 624

(56) References Cited

U.S. PATENT DOCUMENTS

| | | | |
|---|---|---|---|
| 3,147,913 A | * | 9/1964 | Davies et al. ............. 415/229 |
| 3,727,998 A | | 4/1973 | Haworth et al. |
| 4,019,791 A | * | 4/1977 | Loberg ..................... 384/495 |
| 4,313,712 A | | 2/1982 | Briggs |
| 4,375,906 A | | 3/1983 | Roberts et al. |
| 4,453,890 A | | 6/1984 | Brantley |
| 4,827,712 A | | 5/1989 | Coplin |
| 4,981,415 A | * | 1/1991 | Marmol et al. ............. 415/231 |
| 5,433,584 A | | 7/1995 | Amin et al. |
| 5,791,789 A | * | 8/1998 | Van Duyn et al. .......... 384/624 |
| 5,974,782 A | | 11/1999 | Gerez |
| 6,002,778 A | | 12/1999 | Rossetti et al. |
| 6,009,701 A | * | 1/2000 | Freeman et al. ............. 60/223 |
| 6,073,439 A | | 6/2000 | Beaven et al. |
| 6,079,200 A | * | 6/2000 | Tubbs ........................... 415/9 |
| 6,082,959 A | * | 7/2000 | Van Duyn ..................... 415/9 |
| 6,098,399 A | | 8/2000 | Richards et al. |
| 6,109,022 A | | 8/2000 | Allen et al. |
| 6,240,719 B1 | | 6/2001 | Vondrell et al. |
| 6,318,899 B1 | * | 11/2001 | Boyd ......................... 384/492 |
| 6,331,078 B1 | * | 12/2001 | Van Duyn ................... 384/624 |
| 6,402,469 B1 | * | 6/2002 | Kastl et al. .................... 416/2 |

FOREIGN PATENT DOCUMENTS

| | | | | |
|---|---|---|---|---|
| DE | 2157514 A | * | 8/1972 | ............. 60/39.091 |
| GB | 2 192 233 A | | 1/1988 | |

* cited by examiner

*Primary Examiner*—Christopher Verdier
(74) *Attorney, Agent, or Firm*—William Scott Andes; Armstrong Teasdale LLP

(57) ABSTRACT

A bearing assembly for a gas turbine engine rotor includes a paired race, a bearing, a mounting joint, and a plurality of mechanical fuses. The paired race includes an outer race and an inner race. The bearing is between the inner and outer races, and is configured to support the rotor on a support frame. The mounting joint includes a joint inner race and a joint outer race. At least one of the joint inner race and the joint outer race includes a spherical surface. The mounting joint is configured to reduce dynamic loads to the gas turbine engine structure and static bending to the rotor. The plurality of mechanical fuses extend through at least one of the joint inner race and the joint outer race.

20 Claims, 4 Drawing Sheets

METHOD AND APPARATUS FOR SUPPORTING ROTOR ASSEMBLIES DURING UNBALANCES

BACKGROUND OF THE INVENTION

This invention relates generally to gas turbine engine rotor assemblies, and more specifically to bearing assemblies for gas turbine engine rotor assemblies.

Gas turbine engines typically include a rotor assembly, a compressor, and a turbine. The rotor assembly includes a fan that includes an array of fan blades extending radially outward from a rotor shaft. The rotor shaft transfers power and rotary motion from the turbine to the compressor and the fan and is supported longitudinally with a plurality of bearing assemblies. Additionally, the rotor assembly has an axis of rotation that passes through a rotor assembly center of gravity. Known bearing assemblies include rolling elements and a paired race, wherein the rolling elements are supported within the paired race. To maintain rotor critical speed margin, the rotor assembly is supported on three bearing assemblies, one of which is a thrust bearing assembly and a second pair of which are roller bearing assemblies. The thrust bearing assembly supports the rotor shaft and minimizes axial and radial movement of the rotor shaft assembly. The remaining roller bearing assemblies support radial movement of the rotor shaft.

During operation of the engine, a fragment of a fan blade may become separated from the remainder of the blade. Accordingly, a substantial rotary unbalance load may be created within the damaged fan and carried substantially by the fan shaft bearings, the fan bearing supports, and the fan support frames.

To minimize the effects of potentially damaging abnormal imbalance loads, known engines include support components for the fan rotor support system that are sized to provide additional strength for the fan support system. However, increasing the strength of the support components undesirably increases an overall weight of the engine and decreases an overall efficiency of the engine when the engine is operated without substantial rotor imbalances.

Other known engines include a bearing support that includes a mechanically weakened section, or primary fuse, that decouples the fan rotor from the fan support system. During such events, the fan shaft seeks a new center of rotation that approximates that of its unbalanced center for gravity. This fuse section, in combination with a rotor clearance allowance, is referred to as a load reduction device, or LRD. The LRD reduces the rotating dynamic loads to the fan support system.

After the primary fuse fails, the pitching fan rotor often induces a large moment to a next closest bearing. The next closest bearing is known as the number two bearing position. The moment induced to the number two bearing induces high bending and stress loads to the fan rotor locally. To relieve the high bending stresses, the radial and pitching rotation stiffness of the number two bearing position are often softened or released. However, in order to maintain a safe shutdown and subsequent windmill of the engine during the time it takes to land an aircraft, the remaining bearing assemblies must remain functional and maintain radial stiffness to provide fan critical speed margin above a fly home windmilling speed.

BRIEF DESCRIPTION OF THE INVENTION

In one aspect of the invention, a method for reducing dynamic loading of a gas turbine engine is provided. The engine includes a rotor shaft assembly that includes a rotor shaft, a bearing assembly, a mounting joint, a support frame, and at least one mechanical fuse. The method includes supporting the rotor shaft on the gas turbine engine support frame with a bearing assembly including an inner race, an outer race, and a rolling element, coupling a mounting joint including a spherical surface to the bearing assembly, coupling at least one mechanical fuse to the mounting joint spherical surface, and operating the gas turbine engine.

In another aspect, a bearing assembly for a gas turbine engine rotor is provided. The bearing assembly includes a paired race, a bearing, a mounting joint, and a plurality of mechanical fuses. The paired race includes an outer race and an inner race. The bearing is between the inner and outer races, and is configured to support the rotor on a support frame. The mounting joint includes a joint inner race and a joint outer race. At least one of the joint inner race and the joint outer race includes a spherical surface. The mounting joint is configured to reduce dynamic loads to the gas turbine engine structure and static bending to the rotor. The plurality of mechanical fuses extend through at least one of the joint inner race and the joint outer race.

In a further aspect, a rotor assembly is provided. The rotor assembly includes a rotor shaft, a support frame, a bearing assembly, and at least one mechanical fuse. The bearing assembly supports the rotor shaft to the support frame, and is configured to reduce dynamic loads to the support frame. The bearing assembly includes a paired race, a rolling element, and a mounting joint. The paired race includes an outer race and an inner race. The rolling element is between the outer and inner races. The mounting joint includes a spherical surface. Each mechanical fuse extends through the mounting joint.

DETAILED DESCRIPTION OF THE INVENTION

Figure 1:
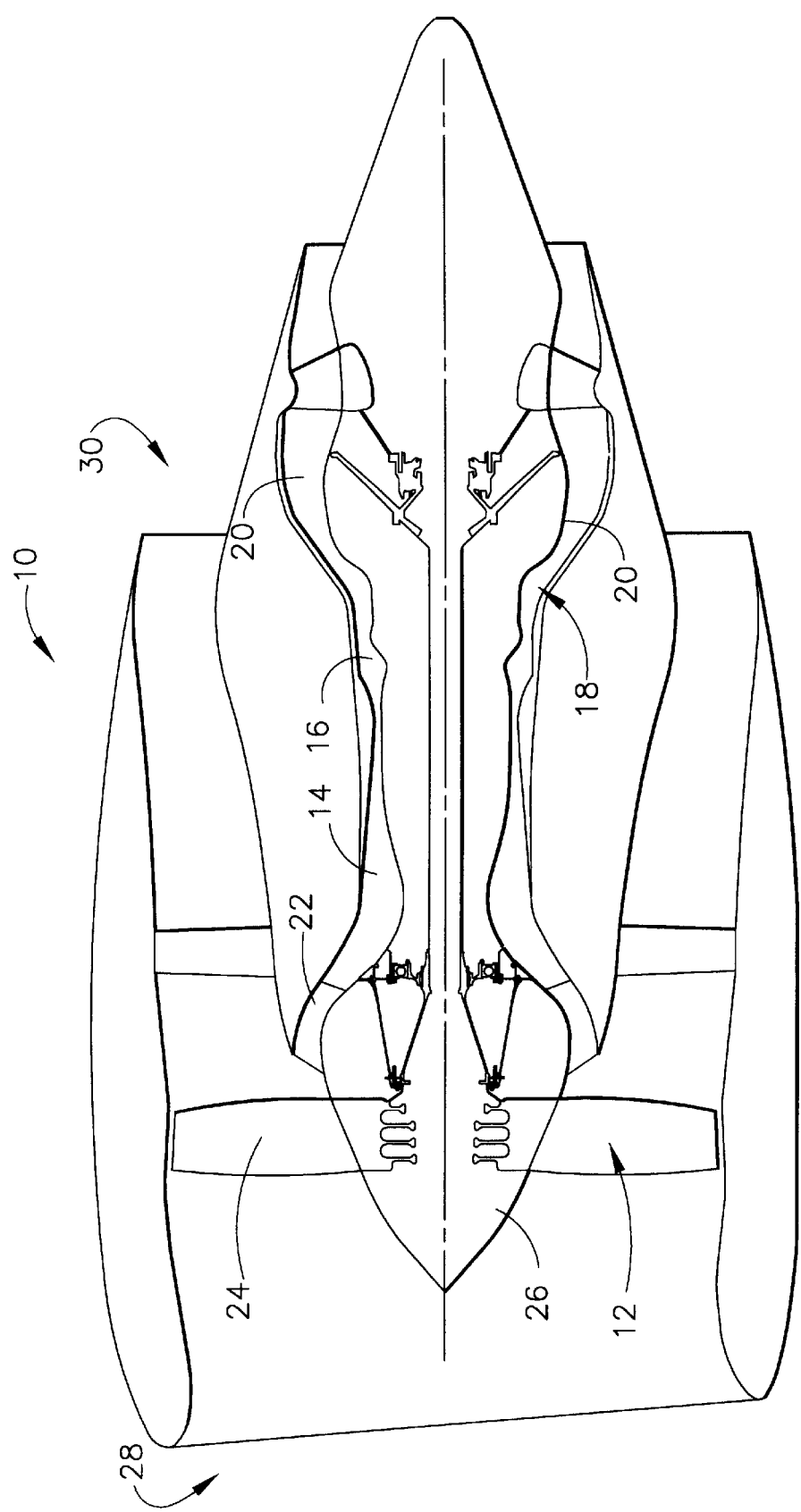
FIG. 1 is schematic illustration of a gas turbine engine.

FIG. 1 is a schematic illustration of a gas turbine engine 10 including a fan assembly 12, a high pressure compressor 14, and a combustor 16. Engine 10 also includes a high pressure turbine 18, a low pressure turbine 20, and a booster 22. Fan assembly 12 includes an array of fan blades 24 extending radially outward from a rotor disc 26. Engine 10 has an intake side 28 and an exhaust side 30. In one embodiment, the gas turbine engine is a GE90 available from General Electric Company, Cincinnati, Ohio.

In operation, air flows through fan assembly 12 and compressed air is supplied to high pressure compressor 14. The highly compressed air is delivered to combustor 16. Airflow (not shown in FIG. 1) from combustor 16 drives turbines 18 and 20, and turbine 20 drives fan assembly 12.

Figure 2:
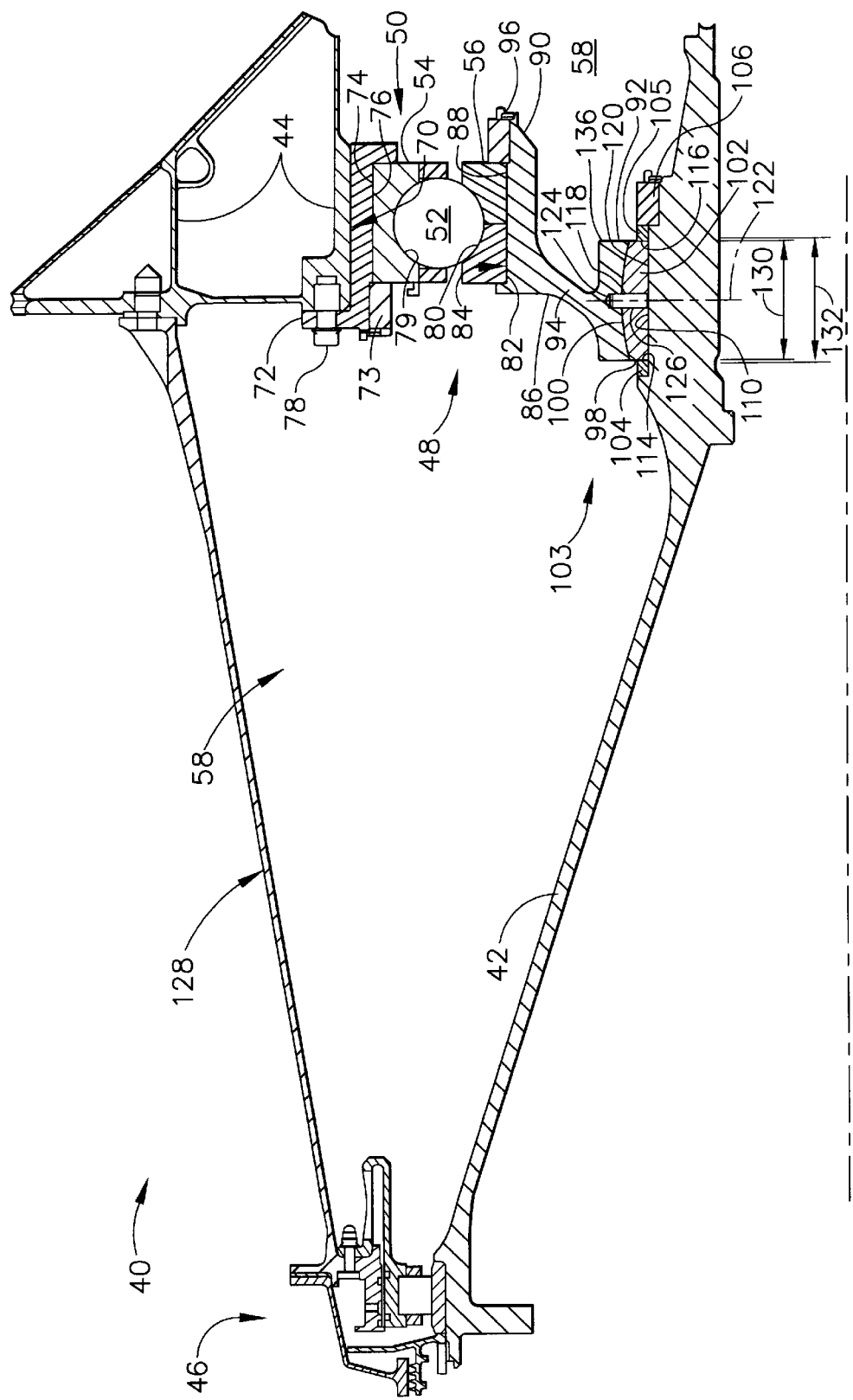
FIG. 2 is a partial cross-sectional view of a rotor assembly that may be used with the gas turbine engine shown in FIG. 1.

FIG. 2 is a cross-sectional view of a rotor and bearing assembly 40 that may be used with a gas turbine engine, such as engine 10 shown in FIG. 1. Rotor and bearing assembly 40 includes rotor disc 26 (shown in FIG. 1) and a rotor shaft 42 which supports an array of fan blades 24 (shown in FIG. 1) that extend radially outward from rotor disc 26. Rotor shaft 42 is rotatably secured to a structural support frame 44 with longitudinally spaced bearing assemblies 46 and 48 that support rotor shaft 42 on support frame 44. In one embodiment, bearing assembly 48 is located in a number two bearing position, aft of number one bearing 46, and is a fan thrust bearing.

In an exemplary embodiment, each bearing assembly 48 includes a paired race 50 and a rolling element 52. Paired race 50 includes an outer race 54 and an inner race 56 radially inward from outer race 54. Rolling element 52 is disposed between inner race 56 and outer race 54. Bearing assembly 48 is enclosed within a sealed annular compartment 58 radially bounded by rotor shaft 42 and support frame 44. Rolling element 52 may be a plurality of elements including, but not limited to, a ball bearing or a roller bearing.

Support frame 44 includes a recess 70 defined within a bearing support 72 and sized to receive outer race 54. Outer race 54 is secured within bearing support 72 with a spanner nut 73 such that an outer surface 74 of outer race 54 is adjacent an inner surface 76 of bearing support 72. A fastener 78 secures bearing support 72 and outer race 54 within recess 70. In one embodiment, bearing support 72 is radially flexible. A face 79 of outer race 54 is contoured and sized to receive rolling element 52 in rollable contact.

Inner race 56 includes a face 80 and an inner surface 82. Inner race face 80 is contoured and sized to receive rolling element 52 in rollable contact. Inner race 56 is secured within a recess 84 within a cone shaft 86 such that inner race inner surface 82 is adjacent an outer surface 88 of recess 84. In one embodiment, inner race 56 is split race mating and rolling element 52 is a ball bearing. In another embodiment, outer race 54 is split race mating and rolling element 52 is a ball bearing.

Cone shaft 86 extends radially outward from fan rotor shaft 42 and includes an outer portion 90, an inner portion 92, and a body 94 extending therebetween. Recess 84 extends within cone shaft outer portion 90 and is sized to receive inner race 56. A bearing spanner nut 96 secures inner race 56 within cone shaft recess 84. Body 94 provides axial and radial support to bearing assembly 48. Cone shaft inner portion 92 includes an inner surface 98. Inner surface 98 is contoured to fit in slidable contact against a face 100 of a mounting race 102. More specifically, in one embodiment, cone shaft inner portion 92 and mounting race 102 are known as a mounting joint 103.

Mounting race 102 reduces static loads to rotor assembly 40 and dynamic loads to support frame 44. In one embodiment, mounting race 102 is secured to fan rotor shaft 42 with a pair of spacers 104 and 105, and a spanner nut 106. Accordingly, mounting race 102 rotates simultaneously with rotor shaft 42. Fan rotor shaft 42 includes a recess 110 sized to receive mounting race 102 and spacers 104 and 105 such that a gap (not shown) exists between an inner face 114 of spacer 104 and an inner face 116 of spacer 105. Mounting race face 100 is a spherical surface. In one embodiment, mounting race 102 is radially thin and is ovalized elastically to assemble to cone shaft inner portion 92.

A plurality of mechanical fuses 118 extend through mounting race 102 into cone shaft inner portion 92 to couple mounting race 102 to cone shaft inner portion 92. More specifically, each fuse 118 extends from an inner surface 120 of mounting race 102 through spherical face 100 and at least partially into cone shaft inner portion 92. In the exemplary embodiment, each mechanical fuse 118 extends radially outward along a centerline axis 122 of mounting race 102.

In the exemplary embodiment, each fuse body 126 has a cross-sectional profile that is substantially constant through body 126. In an alternative embodiment, each fuse body 126 includes an area (not shown) along a shear plane that has a reduced cross-sectional profile. The shear plane is defined as the plane of fuse 118 at mounting race face 100. The reduced cross section at the shear plane provides radial clearance to avoid fuse edge loading and/or stress concentrations during normal spherical deflections. Shear failure, as described in more detail below, will still be the primary failure mode.

During operation of engine 10, an unbalance of engine 10 may cause high radial forces to be applied to fan assembly 12 (shown in FIG. 1) and a forward most engine bearing. The high radial forces may cause a primary fuse portion 128 to fail at an engine number one bearing position. The primary fuse failure allows fan assembly 12 to rotate about a new axis of rotation, passing through a center of gravity of rotor shaft 42 and inducing bending loads on rotor shaft 42 that induce a moment load on bearing assembly 48 at the number two engine bearing position.

Mechanical fuse 118 is fabricated from a material that fails at a pre-determined moment load applied to rotor shaft 42. Furthermore, the material used to fabricate mechanical fuse 118, and the design of mounting joint 103 enables more accurate predictions of the failure point of mechanical fuse 118. After mechanical fuse 118 fails in shear, mounting race spherical face 100 allows shaft 42 to pitch such that a shaft center of rotation (not shown) approaches that of the new rotor center of gravity. The spacers 104 and 105 allow for rotor pitching such that rotor 42 does not contact shaft inner portion 92.

The pitch rotation occurs once because an unbalance radial load has no relative rotation to shaft 42. Rotor shaft 42 remains in a singular bent position because the unbalance radial load is in a singular location. As a result, mounting race spherical face 100 does not oscillate and bearing assembly faces 79 and 80 remain flush against bearing assembly rolling element 52 while rotor shaft 42 rotates. Accordingly, static bending loads transmitted to rotor assembly 40 are reduced because no moment load is induced through bearing 52 after mechanical fuses 118 fail.

Furthermore, because no moment load is carried through surfaces 98 and 100, bearing assembly 48 retains radial and axial load capability.

Because a moment restraint is released, rotor assembly 40 is permitted to approach the rotor center of gravity and dynamic loads induced to support frame 44 are reduced. Furthermore, because spherical mounting face 100 and rolling element 52 keep rotor shaft 42 positioned axially with respect to support frame 44, turbine clashing between rotor assembly 40 and a stator assembly (not shown) is substantially eliminated.

Figure 3:
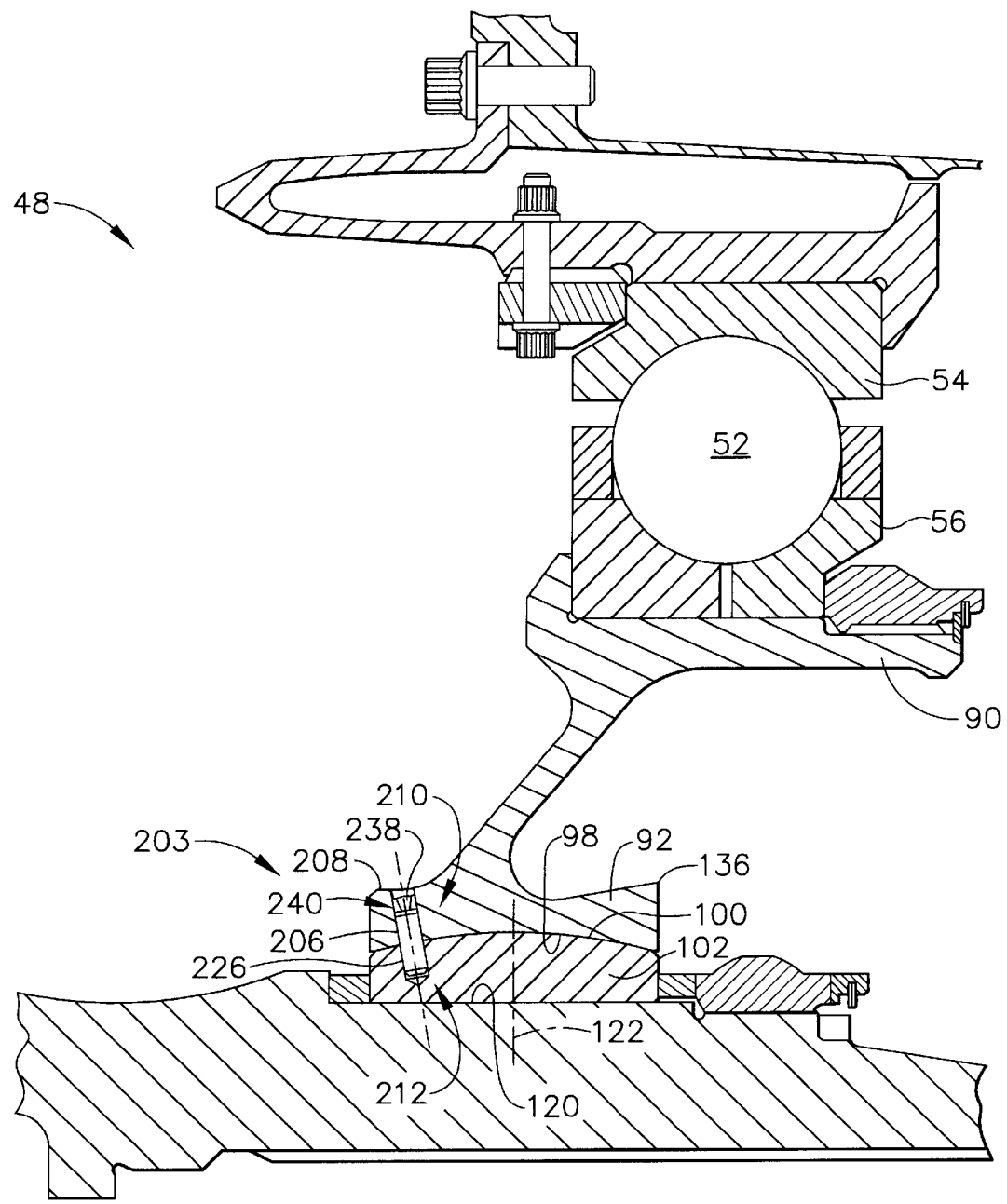
FIG. 3 is an enlarged partial cross-sectional view of a rotor bearing assembly shown in FIG. 2 and including an alternative embodiment of a mounting joint.

FIG. 3 is an enlarged partial cross-sectional view of rotor bearing assembly 48 including a mounting joint 203. Mounting joint 203 is substantially similar to mounting joint 103 shown in FIG. 2 and components in mounting joint 203 that are identical to components of mounting joint 103 are identified in FIG. 3 using the same reference numerals used in FIG. 2. More specifically, mounting joint 203 includes cone shaft inner portion 92 and mounting race 102. Mounting joint 203 also includes a plurality of mechanical fuses 206.

Mechanical fuses 206 extend through cone shaft inner portion 92 into mounting race 102 to couple mounting race 102 to cone shaft inner portion 92. More specifically, each fuse 206 extends from an outer surface 208 of cone shaft inner portion 92 through inner portion 92 and at least partially into mounting race 102 through spherical face 100. In the exemplary embodiment, each mechanical fuse 206 extends obliquely into mounting race 102 with respect to mounting race centerline axis 122. More specifically, each mechanical fuse 206 extends through an upstream portion 210 of cone shaft inner portion 92 into an upstream half 212 of mounting race 102.

In the exemplary embodiment, each fuse body 226 has a cross-sectional profile that is substantially constant through body 226. In an alternative embodiment, each fuse body 226 includes an area (not shown) along a shear plane that has a reduced cross-sectional profile. The reduced cross-sectional area is pre-selected to facilitate deflections of mounting joint 203 during normal engine operations, while providing shear failure, as described in more detail below, during an unbalance of the engine.

After mounting race 102 is coupled to cone shaft inner portion 92 with mechanical fuses 206, a press-fit or threaded plug 238 is coupled to each mechanical fuse 206. Plugs 238 facilitate retention of mechanical fuses 206 within cone shaft inner portion 92. In an alternative embodiment, after mounting race 102 is coupled to cone shaft inner portion 92 with mechanical fuses 206, an end 240 of each mechanical fuse 206 is welded to each cone shaft inner portion 92. During operation of engine 10, mechanical fuses 206 fail in shear in a substantially similar manner of that of mechanical fuses 118 (shown in FIG. 2), such that mounting joint 203 functions substantially similar to that of mounting joint 103. This configuration facilitates manufacturing ease and accessibility during drilling an opening into mounting joint 203, such that each fuse 206 may be inserted from outside radially inward.

Figure 4:
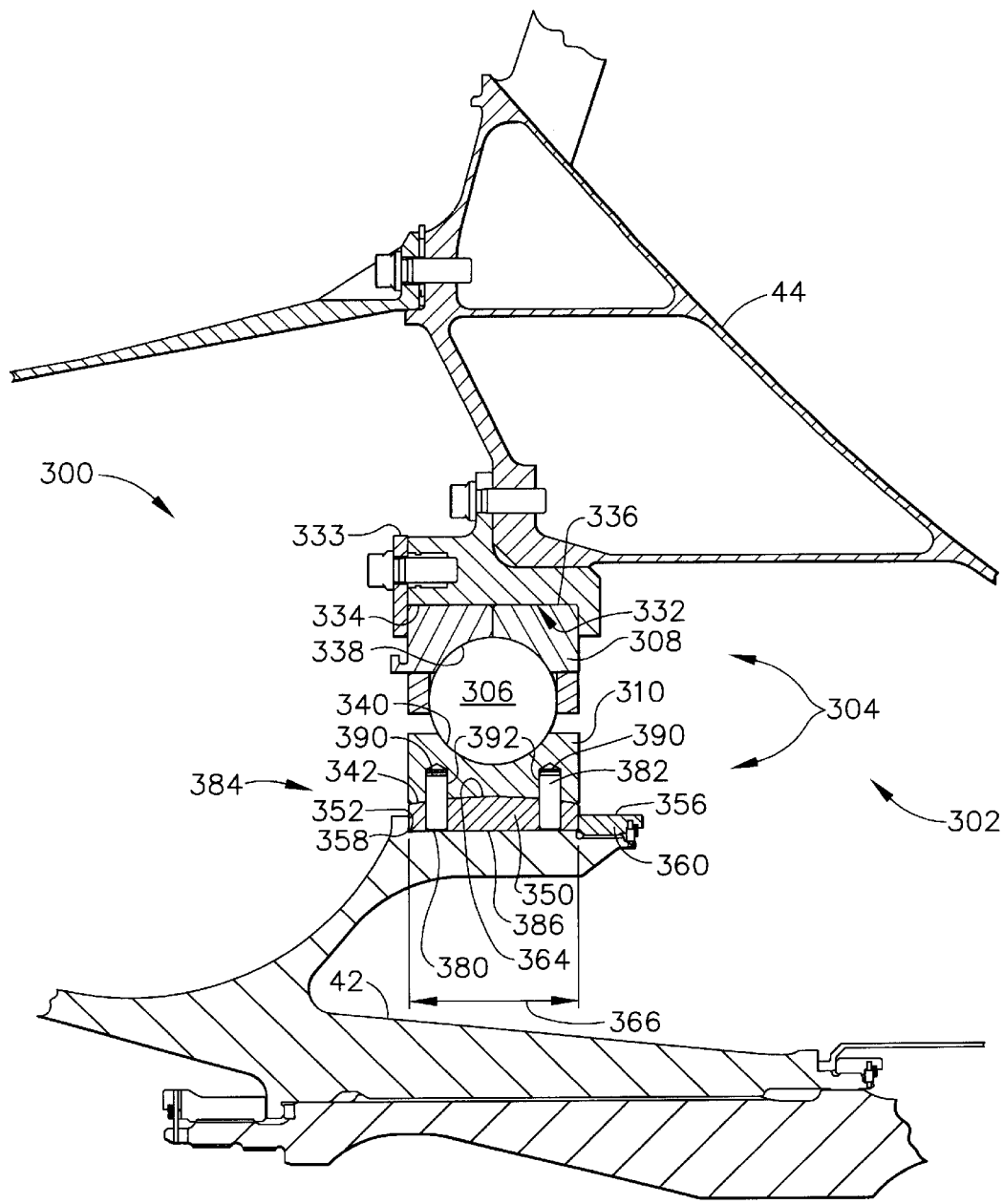
FIG. 4 is an enlarged partial cross-sectional view of an alternative embodiment of a rotor bearing assembly that may be used with the gas turbine engine shown in FIG. 1.

FIG. 4 is an enlarged partial cross-sectional view of an alternative embodiment of a rotor bearing assembly 300 that may be used with a gas turbine engine, such as engine 10 shown in FIG. 1. Rotor assembly 300 is substantially similar to rotor assembly 40 shown in FIG. 2 and components in rotor assembly 300 that are identical to components of rotor assembly 40 are identified in FIG. 4 using the same reference numerals used in FIG. 2. Rotor assembly 300 includes rotor shaft 42 rotatably secured to support frame 44 with longitudinally spaced bearing assemblies 46 and 48 (each shown in FIG. 2) that support rotor shaft 42 on support frame 44. Specifically, a bearing assembly 302 supports shaft 42 in rotor assembly 300. In one embodiment, bearing assembly 46 is a roller bearing and is in a number one bearing position and bearing assembly 302 is a fan thrust bearing and is in a number two bearing position, aft of number one bearing position.

Bearing assembly 302 includes a paired race 304 and a rolling element 306. Paired race 304 includes an outer race 308 and an inner race 310 radially inward from outer race 308. In the exemplary embodiment, outer race 308 is split race mating. In an alternative embodiment, outer race 308 is not a split race mating. Rolling element 306 is disposed between inner race 310 and outer race 308. In one embodiment rolling element 306 is a ball bearing.

Support frame 44 includes a recess 332 sized to receive bearing assembly outer race 308. Outer race 308 is secured within bearing housing recess 332 with a lock plate 333 such that an inner surface 334 of recess 332 is adjacent an outer surface 336 of outer race 308. In an alternative embodiment, outer race 308 is secured within bearing housing recess 332 with a spanner nut. A face 338 of outer race 308 is contoured and receives rolling element 306 in rollable contact.

Inner race 310 includes a face 340 and an inner surface 342. Inner race face 340 is contoured to receive rolling element 306 in rollable contact. Inner race 310 is held in slidable contact with a mounting race 350. Mounting race 350 reduces static bending loads to rotor assembly 300 and dynamic loads to support frame 44.

Fan rotor shaft 42 includes a recess 352 sized to receive mounting race 350. Mounting race 350 is secured within recess 352 with a spanner nut 356 attached to rotor shaft 42. Accordingly, mounting race 350 rotates simultaneously with rotor shaft 42. A face 364 of mounting race 350 is adjacent bearing assembly inner race inner surface 342 and is a spherical surface. In one embodiment, mounting race 350 is radially thin and is ovalized elastically to assemble to inner race 310. Face 364 extends over a width 366 of mounting race 350 between upstream and downstream sides 358 and 360, respectively, of recess 352.

A plurality of first mechanical fuses 380 and second mechanical fuses 382 extend through mounting race 350 into inner race 310 to couple mounting race 350 to inner race 310. In the exemplary embodiment, inner race 310 and mounting race 350 form a mounting joint 384. More specifically, each fuse 380 and 382 extends from an inner surface 386 of mounting race 350 through spherical face 364 and at least partially into inner race 310. In the exemplary embodiment, mechanical fuses 380 are identical with mechanical fuses 382. In an alternative embodiment, mechanical fuses 380 and mechanical fuses 382 are different.

In the exemplary embodiment, each fuse body 392 has a cross-sectional profile that is substantially constant through body 392. In an alternative embodiment, each fuse body 392 includes an area (not shown) along a shear plane that has a reduced cross-sectional profile. The shear plane is defined as the plane of fuse 382 at mounting race 350. The reduced cross section at the shear plane provides radial clearance to avoid fuse edge loading and/or stress concentrations during normal spherical deflections. Shear failure, as described in more detail below, will still be the primary failure mode.

The reduced cross-sectional area is pre-selected to facilitate deflections of mounting joint 384 during normal engine operations, while providing shear failure during an unbalance of the engine.

During operation of the gas turbine engine, if a center of gravity of rotor shaft 42 shifts, pitching motion of rotor shaft 42 causes the primary fuse portion to fail at engine number one bearing support. The failure of the primary fuse portion induces a moment load on bearing assembly 302 at the number two engine bearing position. Mechanical fuses 380 and 382 are fabricated from material that fails in shear at a pre-determined moment load applied to rotor shaft 42. After fuses 380 and 382 fail, mounting race spherical face 364 allows shaft 42 to pitch such that the shaft center of rotation approaches that of the new rotor shaft center of gravity. The pitch rotation occurs once because an unbalance radial load has no relative rotation to shaft 42. As a result, mounting race spherical face 364 does not oscillate and bearing assembly faces 338 and 340 remain flush against bearing assembly rolling element 306 while rotor shaft 42 rotates. Accordingly, static loads transmitted to rotor assembly 300 are reduced because no moment load is induced through rolling element 306 after mechanical fuses 380 and 382 fail.

The above-described rotor assembly is cost-effective and highly reliable. The rotor assembly includes a bearing assembly that includes a paired race and a mounting race. The mounting race is coupled within the rotor assembly with a mechanical fuse that fails in shear when a pre-determined moment load is applied to the bearing assembly. During operation, when the mechanical fuses fail, static bending loads transmitted to the rotor assembly are reduced because no moment load is transmitted through the bearing assembly after the fuses fail. As a result, the rotor assembly does not transmit potentially damaging dynamic loads to the structural frame supporting the rotor shaft because the center of rotation approaches the rotor shaft center of gravity. Furthermore, because the bearing supporting the unbalanced rotor assembly is maintained, the rotor assembly maintains rotational frequency above a fan windmilling frequency.

While the invention has been described in terms of various specific embodiments, those skilled in the art will recognize that the invention can be practiced with modification within the spirit and scope of the claims.

What is claimed is:

1. A method for reducing dynamic loading of a gas turbine engine, the engine including a rotor shaft assembly including a rotor shaft, a bearing assembly, a mounting joint, a support frame, and a plurality of circumferentially spaced mechanical fuses, said method comprising:

supporting the rotor shaft on the gas turbine engine support frame with the bearing assembly, wherein the bearing assembly includes an inner race, an outer race, and a rolling element, such that a cone shaft, including a conical cross-section, extends between the rotor shaft and the bearing assembly;

coupling the mounting joint including a spherical surface to the bearing assembly;

removably coupling each of the plurality of circumferentially spaced mechanical fuses to the mounting joint spherical surface, such that each of the plurality of mechanical fuses extends at least partially into the cone shaft spherical surface, and such that a position of each of the plurality of mechanical fuses is offset axially from a centerplane of the bearing assembly; and operating the gas turbine engine.

2. A method in accordance with claim 1 wherein the mounting joint includes a joint inner race and a joint outer race, wherein coupling the mounting joint to the bearing assembly further comprises:

mounting the mounting joint to the rotor shaft such that the mounting joint is between the bearing assembly and the rotor shaft; and coupling the joint inner race to the joint outer race with the plurality of mechanical fuses that each fail at a predetermined moment load.

3. A method in accordance with claim 1 wherein the mounting joint includes a joint inner race and a joint outer race, coupling the mounting joint to the bearing assembly further comprises:

mounting the mounting joint to the support frame such that the mounting joint is between the cone shaft and the rotor shaft; and coupling the joint inner race to the joint outer race with the plurality of mechanical fuses that each fail at a predetermined moment load.

4. A method in accordance with claim 1 wherein removably coupling each of the plurality of mechanical fuses further comprises coupling each of the plurality of mechanical fuses to the mounting joint such that each fuse fails in shear at a predetermined load.

5. A bearing assembly for a gas turbine engine rotor, said bearing assembly comprising:

a paired race comprising an outer race and an inner race;

a bearing between said inner and outer races, said bearing configured to support the rotor on a support frame, such that a cone shaft, having a conical cross-sectional profile, extends between said paired race and an engine rotor shaft;

a mounting joint comprising a joint inner race and a joint outer race, at least one of said joint inner race and said joint outer race comprising a spherical surface, said mounting joint configured to reduce dynamic loads to the gas turbine engine and static bending to the rotor; and a plurality of circumferentially spaced mechanical fuses extending through at least one of said joint inner race and said joint outer race such that a position of each said mechanical fuse is offset axially from a centerplane of said bearing races.

6. A bearing assembly in accordance with claim 5 further comprising a spacer configured to maintain said mounting joint in alignment with respect the rotor.

7. A bearing assembly in accordance with claim 5 wherein said mechanical fuses secure said joint inner race to said joint outer race.

8. A bearing assembly in accordance with claim 7 wherein said mounting joint is between said inner race and the gas turbine engine rotor.

9. A bearing assembly in accordance with claim 7 wherein each said mechanical fuse comprises a pin configured to shear at a predetermined moment load.

10. A bearing assembly in accordance with claim 7 wherein at least one of said inner race and said outer race is between said mounting joint and said support frame.

11. A bearing assembly in accordance with claim 7 wherein said inner race comprises a split race mating.

12. A bearing assembly in accordance with claim 7 wherein said outer race comprises a split race mating.

13. A rotor assembly comprising:
    a rotor shaft;
    a cone shaft, including a conical cross-section;
    a support frame; and
    a bearing assembly supporting said rotor shaft to said support frame and configured to reduce dynamic loads to said support frame, said cone shaft extending between said bearing assembly and said rotor shaft, said bearing assembly comprising a paired race, a rolling element, and a mounting joint, said paired race comprising an outer race and an inner race, said rolling element between said outer and inner races, said mounting joint comprising a spherical surface; and
    a plurality of circumferentially spaced mechanical fuses extending through said mounting joint at least partially into said cone shaft such that a position of each said mechanical fuse is offset axially from a centerplane of said paired race.

14. A rotor assembly in accordance with claim 13 wherein said mounting joint comprises a joint inner race and a joint outer race, at least one of said joint inner race and said joint outer race comprises said spherical surface.

15. A rotor assembly in accordance with claim 14 wherein at least one of said plurality of mechanical fuses is configured to fail at a predetermined moment load.

16. A rotor assembly in accordance with claim 14 wherein at least one of said plurality of mechanical fuses couples said mounting joint inner race to said mounting joint outer race.

17. A rotor assembly in accordance with claim 14 wherein said bearing assembly mounting joint is between said bearing assembly inner race and said rotor shaft.

18. A rotor assembly in accordance with claim 14 wherein said mounting joint is between said cone shaft and said rotor shaft.

19. A rotor assembly in accordance with claim 14 wherein said bearing assembly is configured to maintain rotor assembly frequency above a windmill frequency.

20. A rotor assembly in accordance with claim 14 wherein said mounting joint is configured to reduce dynamic loads to said support frame and static bending to said rotor shaft.

* * * * *